United States Patent [19]

Lucas et al.

[11] Patent Number: 4,615,390
[45] Date of Patent: Oct. 7, 1986

[54] SYSTEM TO CONTROL THE COMBINING OF TWO FLUIDS

[75] Inventors: Philip J. Lucas, Golden, Colo.; Charles P. Reese, Katy, Tex.; Cham Ocondi, Aurora, Colo.

[73] Assignee: Standard Oil Company (Indiana), Chicago, Ill.

[21] Appl. No.: 546,614

[22] Filed: Dec. 28, 1983

[51] Int. Cl.$^4$ ............................................. E21B 47/00
[52] U.S. Cl. ...................................... 166/250; 73/155
[58] Field of Search .............. 137/3; 364/502; 73/155; 166/274; 235/487; 166/250

[56] References Cited

U.S. PATENT DOCUMENTS

| | | | |
|---|---|---|---|
| 2,939,469 | 6/1960 | Kampf et al. | 137/9 X |
| 3,309,507 | 3/1967 | Schlein | 364/502 X |
| 3,949,196 | 4/1976 | Spalti et al. | 235/487 |
| 4,008,764 | 2/1977 | Allen | 166/274 |
| 4,267,885 | 5/1981 | Sanderford | 166/250 |
| 4,374,544 | 2/1983 | Westerman et al. | 166/252 |
| 4,448,697 | 5/1984 | McCoy et al. | 166/274 X |
| 4,494,209 | 1/1985 | Agarwal | 364/502 |

OTHER PUBLICATIONS

Reese, C. P., Automatic Control of the Wattenberg Gas Field, Soc. of Petroleum Engineers paper 11111, 1982, 4 pages.

Primary Examiner—Jerry W. Myracle
Attorney, Agent, or Firm—Thomas W. Tolpin; William T. McClain; William H. Magidson

[57] ABSTRACT

A method and related system are disclosed for combining two fluids in correct proportions. The flow rates of the two fluids are measured and the volume proportion of the first fluid to the second fluid is determined from these measurements. The flow rate of the first fluid is then continuously adjusted to bring the proportion of the fluids to and be maintained at a predetermined value. In one embodiment of the present invention, the flow of an inert gas and the flow of a hydrocarbon gas are measured and adjusted prior to combining and injection into a wellbore. A microprocessor is utilized to calculate the proportion of the fluids from the measurements of flow and then to automatically change the position of the valve to adjust the flow rate of the inert gas.

7 Claims, 6 Drawing Figures

SYSTEM TO CONTROL THE COMBINING OF TWO FLUIDS

BACKGROUND OF THE INVENTION

1. Field of the Invention

The present invention relates to a system to control the combining of two fluids and, more particularly, to such a system which automatically controls the volume proportion one fluid to another prior to the combining of the two fluids.

2. Setting of the Invention

In many situations it is necessary to precisely control the proportion of one fluid to another in a final mixture. One such situation is in the introduction of fluids into a wellbore for increased mobility of residual oil and/or for maintaining a desired pressure within a producing formation. For example, in certain reservoirs it has been found that fluids need to be injected into the producing formation to prevent condensate formation. In these situations an inert gas, such as nitrogen, in combination with a dry hydrocarbon gas is injected under pressure into the formation to prevent condensate formation. It is necessary to control the ratio or proportion of the inert gas to the hydrocarbon gas in the final mixture to assure that the inert gas does not damage the reservoir.

In the above situation, difficulties have arisen in controlling the proportion of inert gas to the hydrocarbon gas because these fluids are pressurized to greater than 6000 psi and thereby there is uncertainty as to the accuracy of metering the flow rates at these high pressures, since these fluids are then at greater than nine times their critical point. Other difficulties include inaccurate proportion control by manual operation of mixing valves in response to changes in flow conditions due to operator inattentiveness or fatigue. One solution to this problem is to provide alarms so that when the flow of inert gas and the hydrocarbon gas exceed or fall below a predetermined optimum level, then the alarm will be activated so the operator can take corrective action; however, this solution does not provide the accurateness required in some situations.

Various microprocessor based control systems have been developed for automatically controlling flow of fluids. One such system is described in U.S. Pat. No. 4,267,885 to Sanderford. In Sanderford, the temperature of a produced fluid at the wellhead is measured and is then provided to a process control unit for use in determining the injection parameter values needed to optimize well production. The process control unit, such as a microprocessor, is programmed to interpret the temperature data and to control a high pressure gas control valve. The patent of Sanderford is concerned only with monitoring temperature, and nowhere is it suggested or disclosed in Sanderford to have a system to control the combining of two fluids prior to injection into the wellbore to prevent a condensate formation. Further, the patent to Sanderford does not disclose or suggest the use of remote terminal units (RTU) in radio communication with a central or master terminal unit (MTU) to control the combining of two fluids prior to injection into a wellbore.

Another system to control the injection of fluids into a wellbore is described in U.S. Pat. No. 4,374,544 to Westerman, et al. In Westerman the fluid injection rates during secondary recovery injection operations are controlled by monitoring the bottomhole pressure adjacent the formation while adjusting the fluid injection rate for optimum recovery. Nowhere is it disclosed or suggested in Westerman to have a system to control the combining of two fluids prior to injection into a wellbore. Also, nowhere is it disclosed or suggested in Westerman to use remote terminal units in radio communication with a central or master terminal unit to control the combining of two fluids prior to injection into a wellbore.

Another system used to control the flow rates of fluids being injected into a wellbore is disclosed in SPE Paper 11111 by Charles P. Reese, published in September 1982. Within Reese's paper, a system is described which uses a microprocessor to control the production cycling of a well by continuous adjustment, based upon the changes in an individual well's producing pressures and flow rates. Nowhere is is disclosed or suggested within the Reese paper to control the combining of two fluids prior to injection into a wellbore.

In the above-described systems to control flow rates, a problem often encountered in the field is that the fluid compressor stations, valves, wellbores, etc., are remotely located from each other. These systems, if used in conjunction with remotely located master terminal units to oversee the overall operation of a series of these systems, requires the laying of cable or the use of phone lines to a control station. Laying cable is extremely expensive, as well as the cable oftentimes being cut or damaged by accidents. Further, phone lines are nonexistent in many remote locations. One system used to eliminate the need for laying cable is utilizing a radio-telemetry system which takes advantage of individual, remotely located terminal units which send the necessary data via a radio link to a central or master terminal unit, which then causes the appropriate corrective action to be initiated. The use of remote terminal units in communication with a central or master terminal unit is described in the Reese SPE paper, supra, and has been utilized by Amoco Pipeline Company, called the AMOCAMS system. With the AMOCAMS system, remote terminal units (RTU's) are located at pumping stations on a pipeline. The RTU's send data on flow rate, pressure, valve positions and the like via telephone lines or radio link to a master terminal unit (MTU) which calculates what, if any, corrective action is necessary and sends a control signal back to the RTU's to initiate the appropriate action. The use of RTU's and MTU's, such as an AMOCAM system, have not, prior to the present invention, been suggested or disclosed to be used to control the combining of fluids prior to injection into a wellbore.

SUMMARY OF THE INVENTION

The present invention provides a system and related method of use for controlling the combining of two fluids, and includes a device to measure the flow rate of a fluid through a first conduit and a device to measure the flow rate of a second fluid through a second conduit. A data processing unit, such as a microprocessor, is in communication with both flow rate measurement devices and calculates the proportion of the first fluid to the second fluid. At least one flow adjustment device, such a control valve, is provided, such as on the first conduit, and is in operative communication with the data processing unit, so the data processing unit can control the flow adjustment device to adjust the flow rate of the first fluid to a predetermined optimum proportion of the first fluid to a second fluid, thus maintaining such proportion automatically.

One embodiment of the present invention is used to control the combining of an inert gas, such as nitrogen, with a hydrocarbon gas prior to injection into a well. In this embodiment, the flow rates of the inert gas and the hydrocarbon gas are monitored and the flow rate of the inert gas is adjusted to be at an optimum proportion of inert gas to hydrocarbon gas prior to injection of the well. Further, in this embodiment, the flow rate measurement devices are equipped with remote terminal units and are in communication with a master terminal unit, which includes a microprocessor, located adjacent a control valve.

It should be understood that the present invention provides a novel system, not dependent upon human operation, to remotely control the combining of two fluids prior to injection into a wellbore and which is contemplated to overcome the disadvantages of the above-described systems used in the past.

DETAILED DESCRIPTION OF THE PREFERRED EMBODIMENT

The present invention is a system for controlling the combining of at least two fluids. In the operation of the system, the flow rate of a first fluid through a first conduit is measured and the flow rate of a second fluid through a second conduit is measured. The flow rates are then provided to a calculating device to calculate the relative volume proportion of the first fluid to the second fluid. The flow rate of the first fluid can be adjusted to bring the calculated proportion of the first fluid to a second fluid into and maintain it within a present optimum range. Thereafter, the first fluid and the second fluid are combined and injected into a wellbore or used in other operations as may be desired.

The present invention can be utilized to control the combining of fluids in many different applications. However, for the purposes of this discussion, the present invention will be described in relation to a system to control the combining of an inert gas with a hydrocarbon gas prior to the injection of these fluids into a wellbore.

Figure 1:
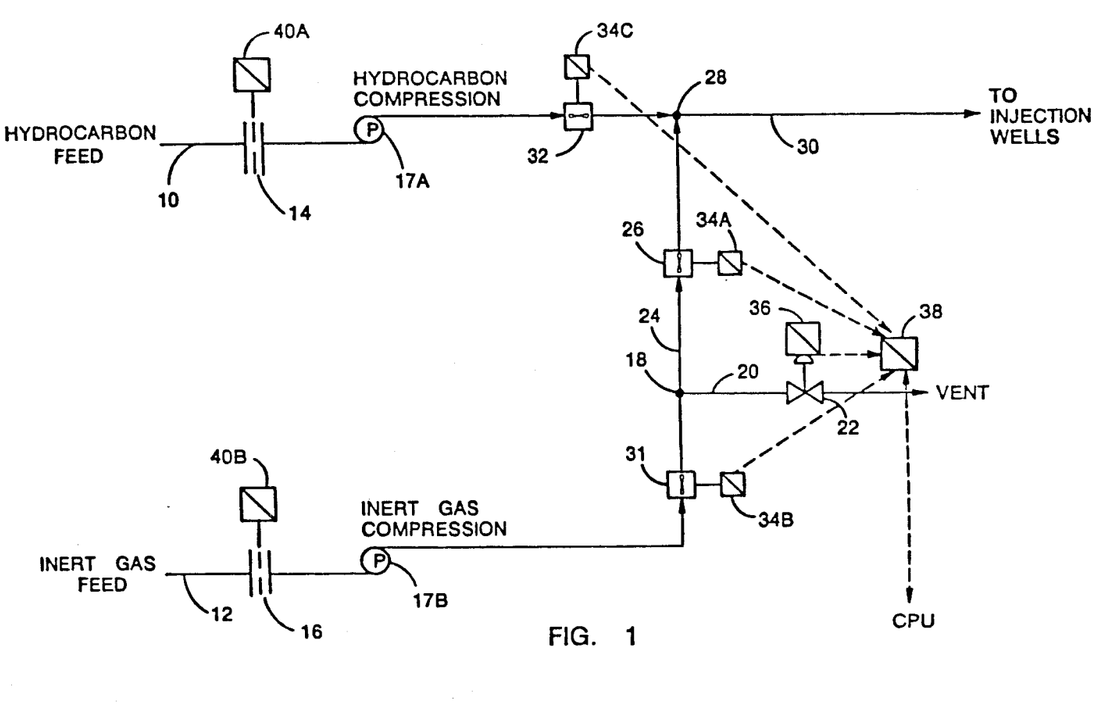
FIG. 1 is a semidiagrammatic view of a system to control the combining of two fluids, embodying the present invention.

For better understanding of the present invention, reference will be made to the attached drawings. One embodiment of the present invention is illustrated in FIG. 1 wherein a hydrocarbon gas is provided under pressure through a conduit 10 and an inert gas, such as nitrogen, $CO_2$, or the like, is provided under pressure through a conduit 12. A device to measure flow rates, such as a flow meter, turbine meter, orifice device, or the like, 14 is connected to the conduit 10 and another similar device 16 is connected to the conduit 12. These metering devices are placed before a compressor or pump 17A for hydrocarbon service and compressor or pump 17B for inert gas service. The metering devices 14 and 16 can include temperature and pressure sensing devices which are utilized to determine the flow rates. A T-connection 18 is provided on the conduit 12 and a side conduit 20 extends therefrom which passes through a control valve 22, the output of which is connected to a vent or diffuser. Connected to the other outlet from the T-connection 18 is a conduit 24 to which is connected a flow meter 26. The conduits 10 and 24 are connected to a second T-connection 28, from which extends a conduit 30 which provides the now combined fluids to the injection system (now shown).

In the embodiment of the present invention shown in FIG. 1, the total flow of the hydrocarbon gas through the conduit 10 will always be passed to the injection well(s) and the inert gas flow rate will be adjusted to assure that the optimum proportion of inert gas to hydrocarbon gas is injected into the wellbore.

In the embodiment shown in FIG. 1, the flow rates of the inert gas through the conduit 12 is from about 2000 to about 35,000 cubic feet per minute (cfpm) while the flow rate of the hydrocarbon gas through the conduit 10 is from about 3000 to about 60,000 cfpm. Also, the pressure of the inlet inert gas is from about 100 to about 150 psi while the pressure of the hydrocarbon gas is from about 900 to about 1000 psi. The compressors 17A and 17B increase the pressure of the individual fluids to the desired injection pressure, such as about 2000 psi to greater than about 8000 psi.

The proportion of inert gas to the hydrocarbon gas can vary depending upon the type and configuration of the producing formation, into which the fluids are to be injected. In the Anschutz Ranch East Field in Utah and Wyoming the volume percentage of inert gas to the final inert gas-hydrocarbon mixture is from about 15% to about 50%, and preferably about 35%–40%.

The system illustrated in FIG. 1 can be operated with an additional flow meter 31 on the conduit 12; however, the system can be operated by utilizing the flow rate of the inert gas upstream from the control valve 22 and the flow rate of the hydrocarbon gas from a flow meter 32 to calculate the proportion of inert gas to hydrocarbon gas. Also, the system can be adapted to control the flow, pressure and mixed proportions of the inert gas and the hydrocarbon gas with or without venting by the addition of flow control valves ahead of the flow meters 31 and 32 and, if desired, the elimination of the control valve 22 and vent line 20. In this situation, the flow rates of both the inert gas and the hydrocarbon gas can be controlled, as is well known in the art.

In the embodiment shown in FIG. 1, the control valve 22 is operated in a sonic flow condition and inert gas which flows through the control valve 22 is vented to the atmosphere. Due to the pressures utilized in pumping the inert gas, any inert gas preferably is passed through a muffler or diffuser device to reduce the noise of the vented inert gas. Also, alarms or warning devices are included with the system to indicate if the control valve 22 is inoperative and what position it is in, as well as power loss alarms at the pump 17A and 17B and/or the valve 22. An oxygen content alarm (not shown) can be included in the inert gas conduit 12 to monitor and record the amount of oxygen in the inert gas stream.

The flow meters 26, 31 and 32 can be connected via an electrical cable, telephone line, fiber optic cable or radio link, to a data processing unit (not shown) utilized to calculate the proportion of the inert gas to the hydrocarbon gas. The data processing unit, if its proportion calculations indicate that the proportions are outside of the predetermined range, can cause an alarm to sound so that an operator can take corrective action by adjusting the position of the control valve 22. Preferably, the need for the operator is eliminated by having the data processing unit send a signal to a solenoid device (not shown) or the like on the control valve 22 to automatically control the open/close position of the valve 22. Most preferably, the flow meters 26, 31 and 32 and the control valve 22 are each provided with a radio communications and control device used to communicate with a device to automatically control the operation of the system, a detailed description of which will be described hereinbelow.

Operatively connected to a data output port of each of the flow meters 26, 31 and 32 and the control valve 22 is a remote terminal unit (RTU) 34A, 34B, 34C, and 36, respectively. The hardware of each RTU will be described in more detail hereinbelow; however, an RTU basically includes devices to receive data and to perform certain calculations on the data, if necessary, and includes a VHF or other similar radio transceiver for communication with a master terminal unit (MTU) 38.

The master terminal unit 38 can be a separate unit located at any appropriate location or the MTU 38 can be part of the RTU 36, which is housed in a single housing, such that all other RTU's send their data to the MTU 38 at the valve 22. In either case, the MTU 38 can be in communication via radio, hard wire or the like, with another command-type MTU or a larger central processing unit, such as a main frame computer. The central processing unit can be programmed to receive the current flow rate, pressure information and the like, as shown in FIG. 1, and perform the calculations to determine the proportion of inert gas to the hydrocarbon gas and the CPU initiates command signals to control the position of the control valve 22.

Further, RTU's can be placed at the compressors 17A and 17B to take data, such as RPM, pressure, etc., from the compressors and provide the data to the MTU 38. RTU's 40A and 40B can be placed at the flow meters 14 and 16, respectively, to transmit flow data to the MTU 38. Also, an RTU (not shown) can be placed in operative communication via a solenoid or the like with a wellhead injection valve on the injection well for controlling the position of the injection valve, as is well known in the art, in response to commands from the MTU 38.

It should be understood that an RTU and an MTU are very similar devices which can be housed in identical housing and can have identical configurations. An RTU can be changed to an MTU and vice versa by changing the circuitry cards and software contained within each RTU and MTU, as will be described in more detail below. In the embodiment shown in FIG. 1, the RTU's gather data in analog form from their respective flow meters and valve. The RTU's then change the analog signal to digital and can perform some processing or conversions on the digital signal by using a computing device, such as a microprocessor, within each RTU. An example of such calculations at the RTU's 40A and 40B is where instead of using flow turbines, orifice devices are used to measure flow. The orifice devices measure differential pressure and when combined with temperature data, pressure data and flow data, all from separate sensors, of the fluid the flow rate can be calculated within the RTU's 40A and 40B by using the following algorithm stored in memory:

$$Q = C \, (P'DP \, (T+460)/520)^{\frac{1}{2}}$$

where:
Q=flow cubic feet/hr
C=orifice flow constant
T=temperature, °F.
P=pressure, psia
DP=differential pressure (in. of $H_2O$)

The digital signal is then sent to a radiotransmitter or transceiver which sends the digital signal via VHF, UHF, or the like to the MTU 38.

The MTU 38 is basically the same as an RTU but has different circuitry cards included therein for storing different algorithms. Within the MTU 38 the digital signals from the RTU's are received either continuously or polled individually at preset sampling increments. The signals are then sent to a microprocessor for calculation of the proportion of inert gas to the hydrocarbon gas. If this calculated value is outside of a preset range, which is stored in memory within the MTU 38, then the appropriate corrective action is initiated by transmitting a response signal to the RTU 36 connected to the controller of the control valve 22. This signal directs the valve controller to either open or close the valve 22 by a preset increment, such as ¼ in. The flow rates are then sampled at a preset time delay and the process will be conducted continuously.

Figure 2:
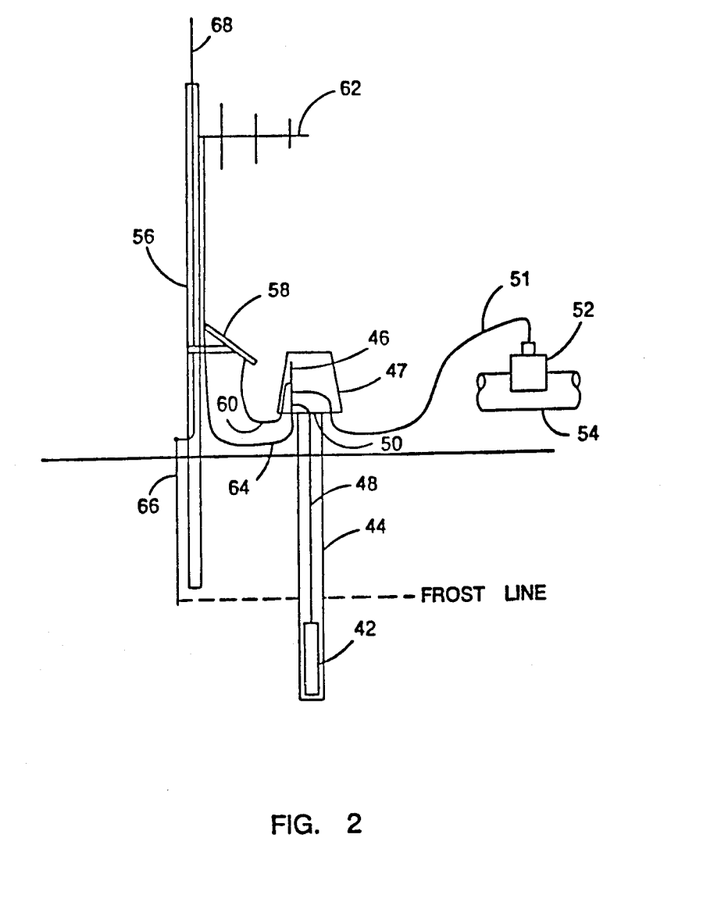
FIG. 2 is an alternate embodiment of the system shown in FIG. 1 and including a central processing unit.

For better understanding of the configuration of the RTU's and also the MTU, reference is made to FIG. 2. In FIG. 2, an RTU or MTU 42 is housed within a pipe 44, such as a 6 in. OD schedule 40 PVC pipe buried about 5 ft-6 ft below ground level, with the RTU 42 maintained below the frost line of the ground. Suitable circuitry in the form of a termination card 46 (disclosed later) for the RTU 42 can be contained within the RTU's top housing 47. A cable 48 extends from the RTU 42, through a cap 50 on the conduit 44, to the termination card 46. A cable 51 connects the termination card with a flowmeter or valve 52 on a conduit 54. Mounted adjacent to the conduit 44 is a pole 56 to which is connected a solar panel 58. The output of the solar panel 58 is provided through a cable 60 to the termination card of the RTU 42. A radio antenna 62 is also mounted to the pole 56 and is connected to the RTU 42 via a cable 64. A ground rod 66 is mounted in the ground and is electrically connected to the lightning rod 68.

The system of FIG. 2 has a normal current consumption of less than about 70 milliamps at 5 volts DC, and the radio transmitter consumes approximately 500 milliamps at 8 volts DC during the transmission of a message; however, the transmissions occur infrequently enough because the RTU's are polled at preset time delays, such as every 5 minutes to 15 minutes, so that the single solar panel 58 can provide sufficient energy with the aid of a storage cell (not shown). Based on the present solar panels used, such as a Solarex HB 1480, and the manufacturer's design specifications, the RTU's and MTU's can tolerate up to a 1.5 watt continuous load or an intermittant equivalent.

This storage cell usually consists of a set of nickel cadmium batteries which are continuously trickle charged. Three taps from this battery pack provide 8 volt DC, 5 volt DC, and a common. The 8 volt DC provides power for radio operations. The nickel cadmium battery was selected since it can tolerate more abuse than the lead acid cell battery and requires less supporting circuitry.

Figure 3:
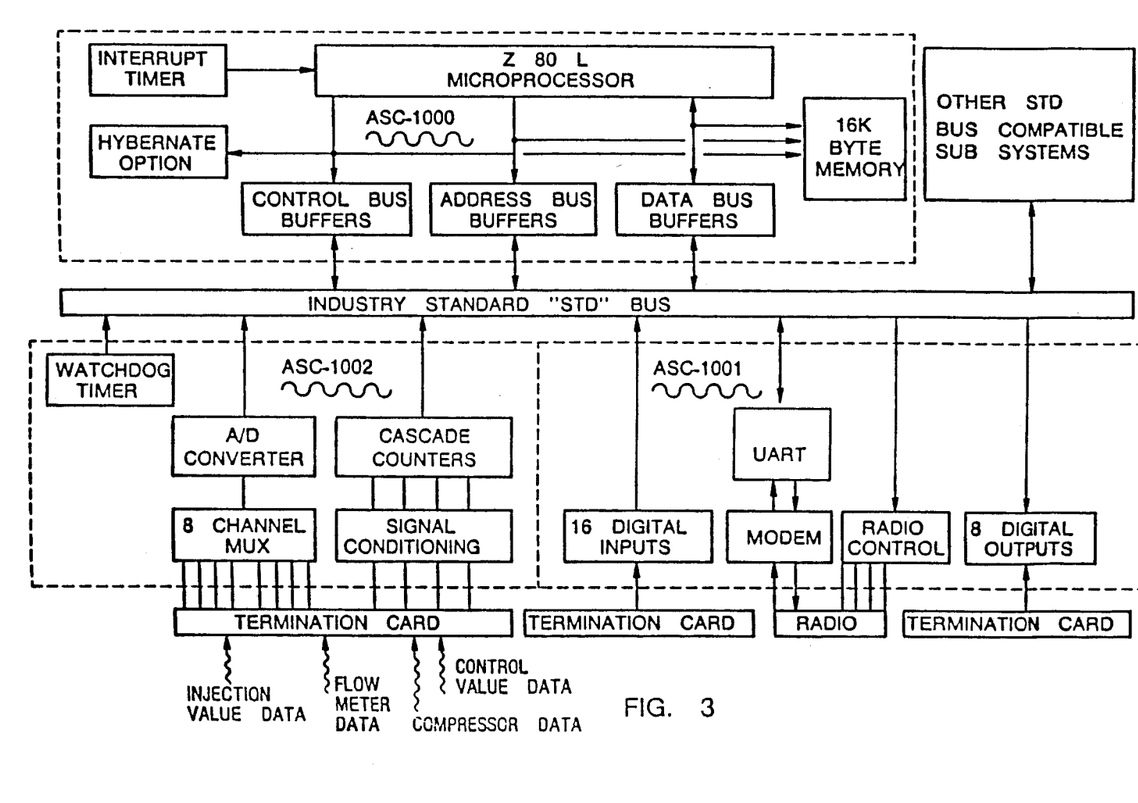
FIG. 3 is a diagram of a field installation of the present invention.

The "brains" of the system of the present invention reside in at least three control logic circuit cards which are housed within the downhole portion of the RTU or MTU. In one embodiment of the present invention, these three cards are labeled as ASC-1000, ASC-1001, and ASC-1002 cards, shown in FIG. 3. The ASC-1000 card is designed to utilize an industry standard "STD Bus." The cards are about 4.5 in. by approximately 6.5 in. and fit within a plastic housing which can be lowered down the pipe 44. The ASC 1000 card includes a microprocessor, such as a Zilog Z80L, which is designed to draw only about 10 milliamps current when operating at 1 MHz. The ASC 1000 card provides a 10 millisecond interrupt timer, data bus drivers, control bus drivers, address bus drivers and room for up to 16K byte of memory. A typical configuration includes at least two erasable programmable read only memories (EPROMS) with a minimum of 1 CMOS random access memory (RAM) chip. The ASC-1000 card, when fully populated, draws less than 50 milliamps at 5 volts DC and 1 MHz.

The ASC 1001 input card is designed to operate in conjunction with the ASC-1000 microprocessor card or any other "STD" bus compatible microprocessor card which is capable of controlling an input/output request line. The ASC-1001 card utilizes CMOS technology components to keep the power consumption to less than about 10 milliamps draw. The input/output capabilities include 16 digital inputs, 8 digital outputs, plus 1 digital output for radio control. The radio control circuitry is used to interface with a radio transmitter module (not shown) and includes a serial communications port which is equipped with a digitally synthesized FSK modem operated at 600 baud for asynchronous communications. The ASC-1000 card is designed so it can be mapped into memory with the ASC-1000 card in any of 16 different locations on the ASC-1000 with a simple jumper selection.

The ASC-1002 card is similar to the ASC 1001 card and is designed to operate in conjunction with the ASC 1000 microprocessor card or any other "STD" bus compatible microprocessor card, which is capable of controlling an input/output request line. The ASC-1002 card also utilizes CMOS technology components to keep the power consumption down to below about 10 milliamps at 5 volts DC. The ASC-1002 card provides the capability to access eight analog channels from different devices, such as valve position indicators, flow meters, and the like. As an added feature, two of the channels can access on board references to provide self-testing or software compensation. The ASC 1002 card includes 8 analog input channels with 8, 10 or 12 bits of resolution, four accumulators designed for pulsed inputs of 0 to 3000 Hz; and a resettable timer. The analog to digital conversion within the ASC-1002 card is accomplished by the use of a Teledyne 8700 series chip, which is pin compatible, thus allowing last minute selection of the desired resolution. The four accumulators utilize a differential OP amp and provide the ability to monitor pulsed signals as low as 30 millivolts, such as received from magnetic pickups on the flow meters typically found in the field. This signal is accumulated in a four-bit cascade counter, which can be easily reset by the processor. The ASC-1002 card is designed so that it can again be mapped into memory on the ASC 1000 in any of 16 different locations with a simple jumper selection.

Figure 4:
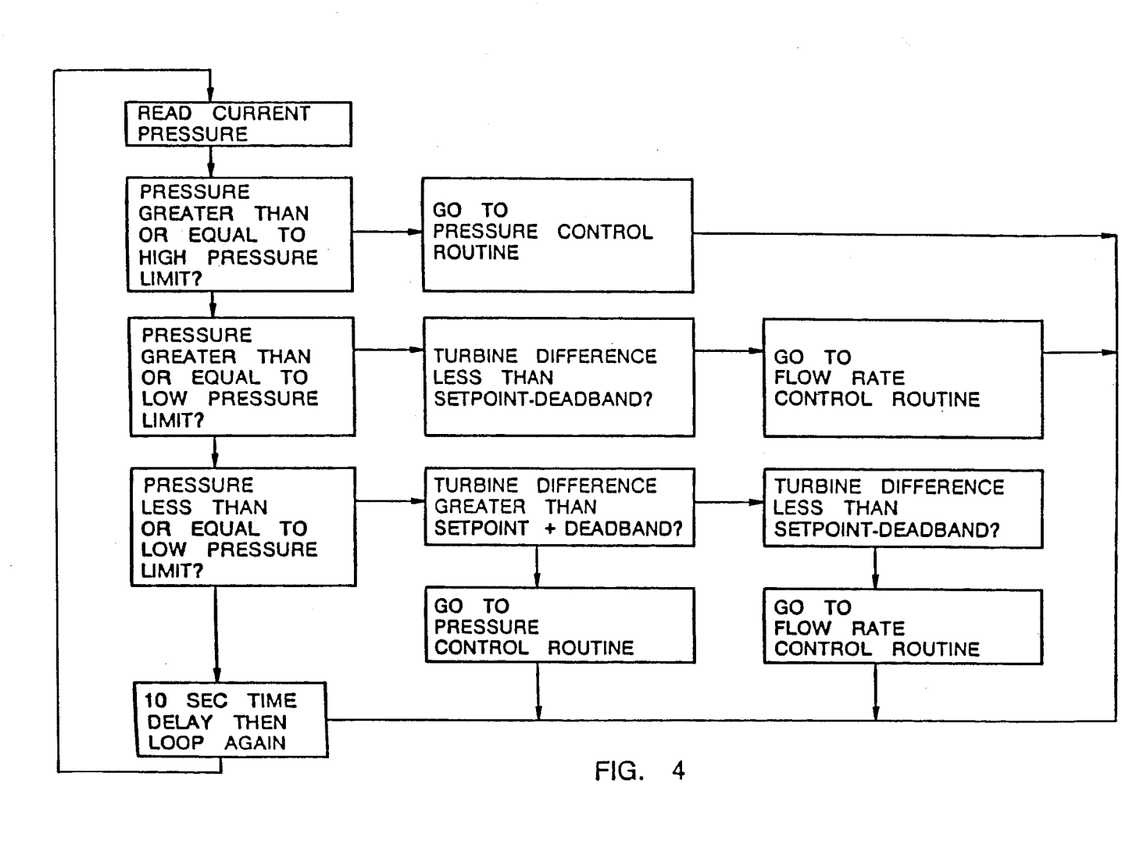
FIG. 4 is a block diagram of a microprocessor-based remote terminal unit.
Figure 5:
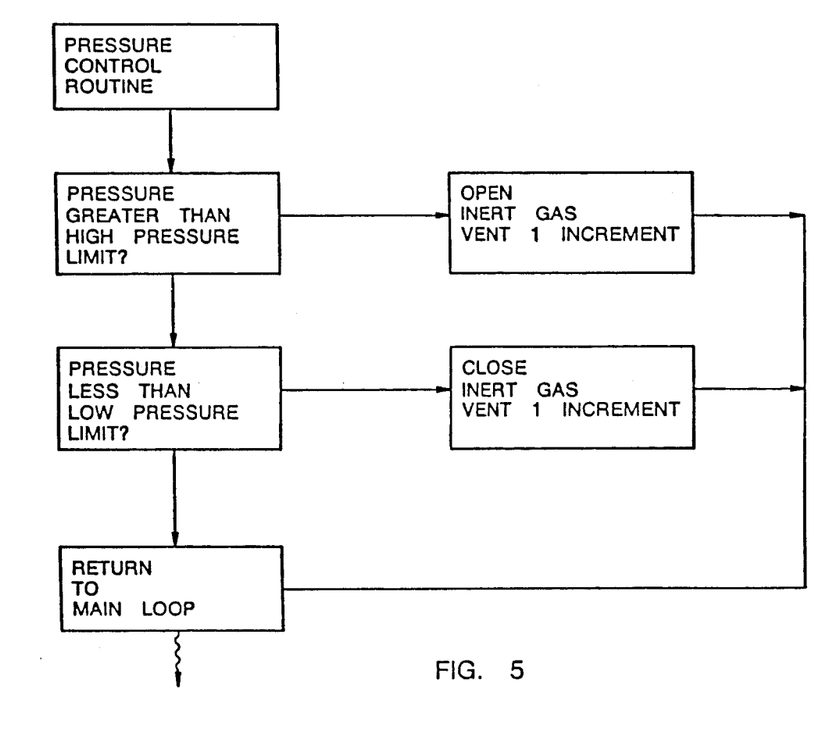
FIGS. 5 and 6 are a flow diagram of the control logic used in controlling the combining of two fluids in one embodiment of the present invention.
Figure 6:
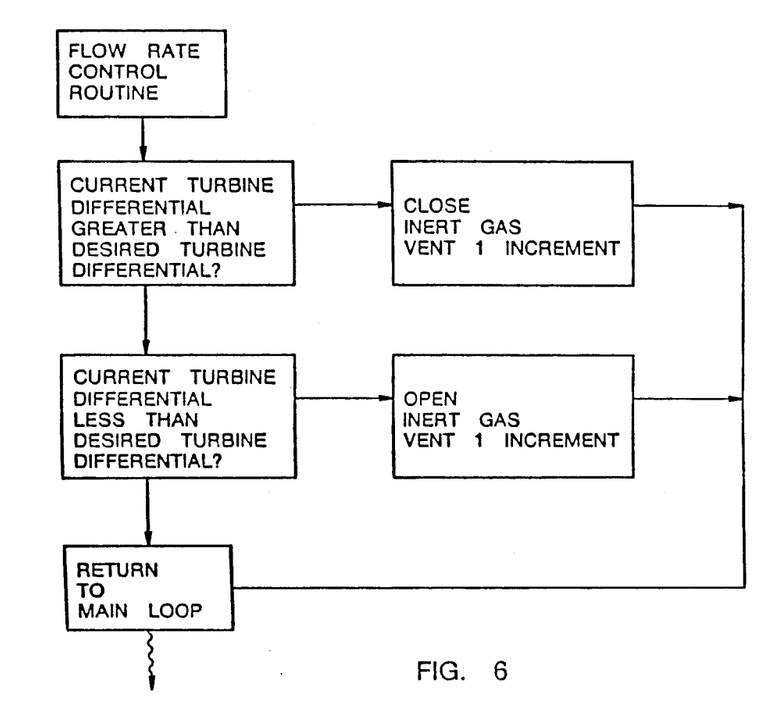

In one embodiment of the present invention, the control logic to regulate the proportion of the inert gas to the hydrocarbon gas is stored in the EPROMS on the ASC-1000 card. An example of such logic is shown in FIGS. 4, 5 and 6 and will not be described in detail because the operation thereof will be obvious to one skilled in the art. In the logic the pressure of the combined fluids is monitored and if too high then the inert gas vent valve is opened one increment, and if too low then the inert gas vent valve is closed one increment. The flow rate of the inert gas is also monitored, but the pressure control functions take precedent. If the flow rate of the inert gas is either too high or too low, then the inert gas vent valve is adjusted accordingly.

Wherein the present invention has been described in particular relation to the drawings attached hereto, it should be understood that other and further modifications, apart from those shown or suggested herein, may be made within the scope and spirit of this invention.

We claim:
1. A method of controlling the injection of at least two fluids into a wellbore, comprising:
   (a) measuring the flow rate of a first fluid comprising an insert gas flowing through a first conduit;
   (b) providing this measurement via a radio transmitter to a remote processing device;
   (c) measuring the flow rate of a second fluid comprising a hydrocarbon gas flowing through a second conduit;
   (d) providing this measurement via a radio transmitter to the remote processing device;
   (e) within the processing device, calculating the relative volume proportions of the first fluid to the second fluid from the measurements taken in steps (a) and (c);
   (f) calculating within the processing device corrective action, if any, to continuously adjust the flow rate of the first fluid to achieve and maintain a predetermined proportion of the first fluid to the second fluid;
   (g) adjusting the flow rate of the first fluid as required to maintain a desired ratio between the first and second fluids by controlling the position of a vent valve on the first conduit;
   (h) combining the first fluid and the second fluid; and
   (i) injecting the combined fluids into a wellbore.

2. A system for controlling the combination and injection of at least two fluids into a wellbore comprising: a source of a first pressurized fluid including an inert gas; a source of a second pressurized fluid comprising a hydrocarbon gas; a first conduit coupled at one end to said source of said first fluid; a second conduit coupled at one end to said source of said second fluid; means coupled to the other end of each of said first and second conduits for combining said fluids; remote data processing means; radio receiver/transmitter means associated with said processing means; first measuring means for measuring the flow rate of said first fluid in said first conduit; means coupled to said first measuring means for radio transmitting measurement data to said remote processing means; second measuring means for measuring the flow rate of said second fluid in said second conduit; means coupled to said second measuring means for radio transmitting measurement data to said remote processing means; calculating means within said processing means for calculating the relative volume proportion of said first fluid to said second fluid from said measurement data; further means within said processing means for calculating a precise corrective action to be taken with respect to the flow rate of said first fluid within said first conduit to achieve and maintain a predetermined proportion of said first fluid to said second fluid; means on said first conduit for adjustably controlling the flow rate of said first fluid, said adjustable control means comprising a valving means including means for venting a portion of said first fluid to atmosphere; radio transceiving means associated with said control means on said first conduit; means for transmitting a corrective action signal from said remote processing means to said control means for adjusting the flow of said first fluid in said first conduit until said predetermined proportion of fluids is achieved and maintained; and means for injecting said proportionally combined fluids into a wellbore.

3. The system of claim 2 wherein the means for measuring comprises a plurality of flow meters.

4. The system of claim 2 wherein the means for measuring includes a plurality of differential pressure measuring devices.

5. The system of claim 2 wherein the means for measuring the flow rates of the two fluids and the means for controlling each include a remote terminal unit, comprising:
 a computer card housing adapted for receiving computer cards to control the operation of the remote terminal unit;
 a radio transmitter and antenna system in operative communication with the computer cards; and
 a power supply.

6. The system of claim 5 wherein the computer card housing is mounted within a conduit adapted for insertion below ground level.

7. The system of claim 5 wherein the power supply includes a solar panel.

* * * * *

UNITED STATES PATENT OFFICE
CERTIFICATE OF CORRECTION

Patent No. 4,615,390   Dated October 7, 1986

Inventor(s) PHILIP J. LUCAS  -  CHARLES P. REESE  -  CHAM OCONDI

It is certified that error appears in the above-identified patent and that said Letters Patent are hereby corrected as shown below:

Patent reads

| Col. | Line | | | | |
|---|---|---|---|---|---|
| 2 | 41 | "(RTU's)" delete apostrophe -- (RTUs) -- | | | |
| 2 | 42 | "RTU's" | " | " | -- RTUs -- |
| 2 | 46 | " | " | " | " |
| 2 | 47 | RTU's" "MTU's" should be -- RTUs  MTUs -- | | | |
| 2 | 64 | "such a control valve" should be -- such as a control valve -- | | | |
| 3 | 47 | "Fluid into and maintain" delete -- into -- | | | |
| 4 | 13 | "(now shown)." should be -- (not shown). -- | | | |
| 5 | 29 | "RTU's" delete apostrophe -- RTUs -- | | | |
| 5 | 40 | " | " | " | " |
| 5 | 43 | " | " | " | " |
| 5 | 58 | " | " | " | " |
| 5 | 59 | " | " | " | " |
| 5 | 63 | " | " | " | " |
| 6 | 1 | " | " | " | " |
| 6 | 18 | " | " | " | " |
| 6 | 32 | " | " | " | " |
| 6 | 56 | " | " | " | " |

UNITED STATES PATENT OFFICE
CERTIFICATE OF CORRECTION

Patent No. 4,615,390  Dated October 7, 1986

Inventor(s) PHILIP J. LUCAS  -  CHARLES P. REESE  -  CHAM OCONDI

It is certified that error appears in the above-identified patent and that said Letters Patent are hereby corrected as shown below:

Patent reads

| Col. | Line |   |   |   |   |
|------|------|---|---|---|---|
| 6 | 61 | "RTU's" | delete apostrophe | -- RTUs -- |
| 6 | 62 | "MTU's" | " | " | -- MTUs -- |

Signed and Sealed this

Twenty-sixth Day of July, 1988

Attest:

DONALD J. QUIGG

Attesting Officer   Commissioner of Patents and Trademarks